United States Patent [19]  [11] 3,875,230
Pissiotas  [45] Apr. 1, 1975

[54] PESTICIDAL 1,3,5-TRIAZAPENTA-1,4-DIENES

[75] Inventor: Georg Pissiotas, Lorrach, Germany

[73] Assignee: Ciba-Geigy Corporation, Ardsley, N.Y.

[22] Filed: June 12, 1974

[21] Appl. No.: 478,679

[30] Foreign Application Priority Data
June 25, 1973 Switzerland.......................... 9243/73
Apr. 26, 1974 Switzerland.......................... 5755/74

[52] U.S. Cl.... 260/564 RF, 260/465 D, 260/465 E, 260/470, 260/471 R, 424/304, 424/309, 424/326
[51] Int. Cl.......................................... C07c 123/00
[58] Field of Search.......... 260/564 RF, 565 D, 470, 260/471 R

[56] References Cited
UNITED STATES PATENTS
3,781,355  12/1973  Harrison et al............... 260/564 RF Primary Examiner—Leon Zitver
Assistant Examiner—Gerald A. Schwartz
Attorney, Agent, or Firm—Harry Falber; Frederick H. Rabin

[57] ABSTRACT 1,3,5-Triazapenta-1,4-dienes having the formula

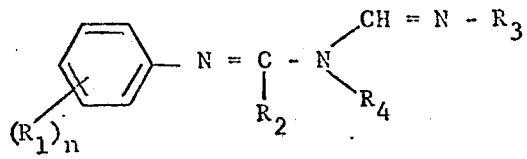

wherein
$R_1$ represents hydrogen or, according to $n$, one or more identical or different radicals such as halogen, alkyl, alkoxy, alkylthio, alkenyloxy, cyano, nitro dialkylamino or carbalkoxy,
$n$ stands for the numbers 1 to 5,
$R_2$ represents hydrogen or alkyl, and
$R_3$ and $R_4$ each represent alkyl,
processes for their preparation, and their use in pest control.

7 Claims, No Drawings

PESTICIDAL 1,3,5-TRIAZAPENTA-1,4-DIENES

The present invention relates to 1,3,5-triazapenta-1,4-dienes, to processes for their preparation, and to their use in pest control.

The said 1,3,5-triazapenta-1,4-dienes have the formula

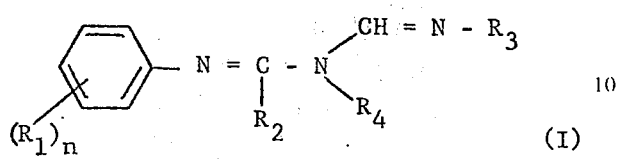

(I)

wherein
- $R_1$ represents hydrogen or, according to $n$, one or more identical or different radicals such as halogen, alkyl, alkoxy, alkylthio, alkenyloxy, cyano, nitro, dialkylamino or carbalkoxy,
- $n$ stands for the numbers 1 to 5,
- $R_2$ represents hydrogen or alkyl, and
- $R_3$ and $R_4$ each represent alkyl.

The alkyl, alkoxy, alkylthio, alkenyloxy and carbalkoxy groups denoted by $R_1$ to $R_4$ contain in the chain one to 18 carbon atoms, in the case of $R_1$, $R_3$ and $R_4$ particularly one to six, and in the case of $R_2$ one to four, or in the case of the alkenyl chains three to 18, preferably three to five carbon atoms. These chains can be straight-chain or branched-chain, unsubstituted, or preferably substituted by one or more identical or different halogen atoms, cyano, hydroxyl, alkoxy or ethylthio groups. By halogen is meant fluorine, chlorine, bromine and/or iodine. Examples of such groups are, inter alia, methyl, methoxy, methylthio, ethyl, ethoxy, ethylthio, trifluoromethyl, chloroethyl, propyl, isopropyl, n-, i-, sec.-, tert.-butyl, alkyloxy and methallyloxy.

Preferred compounds by virtue of their action are those of formula I wherein
- $R_1$ represents hydrogen or, according to $n$, one or more identical or different radicals such as chlorine, $C_1$–$C_4$-alkyl, $C_1$–$C_4$-haloalkyl, $C_1$–$C_4$-alkoxy, $C_1$–$C_4$-alkylthio, $C_3$–$C_5$-alkenyloxy, cyano, nitro, ($C_1$–$C_4$-alkyl)$_2$-amino or carb-$C_2$–$C_4$-alkoxy,
- $n$ stands for the numbers 1 to 3,
- $R_2$ represents hydrogen, and
- $R_3$ and $R_4$ each represent $C_1$–$C_6$-alkyl.

Particularly preferred compounds of formula I are those wherein
- $R_1$ represents hydrogen or, according to $n$, one or more identical or different radicals such as chlorine or methyl,
- $n$ stands for the numbers 1 to 2,
- $R_2$ represents hydrogen, and
- $R_3$ and $R_4$ each represent methyl.

The compounds of formula I can be prepared, for example, by the following methods known per se:

1)

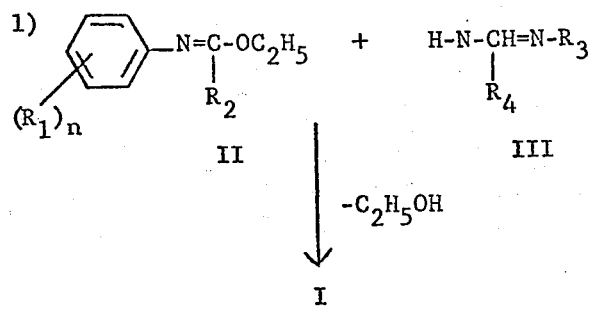

2)

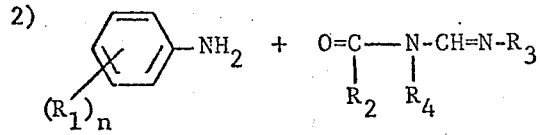

IV  V

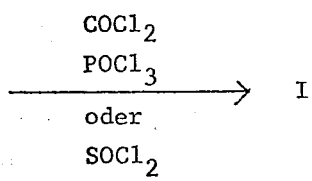

In formulae II to V, the symbols $R_1$ to $R_4$ and $n$ have the meanings given for formula I. The reactions are performed under normal pressure, at a temperature of between 0° and 200°C, and preferably in solvents and diluents inert to the reactants. Suitable solvents or diluents are, for example, the following: aromatic hydrocarbons such as benzene, toluene or ligroins, halogenated hydrocarbons, chlorobenzene, polychlorobenzenes, bromobenzene, chlorinated alkanes having one to three carbon atoms, ethers such as dioxane or tetrahydrofuran; esters such as acetic acid ethyl ester; ketones such as methyl ethyl ketone, diethyl ketone, nitriles, etc..

The starting materials of formulae II to V are in some cases known compounds, or can be prepared by known methods.

The compounds of formula I have a broad biocidal action, and can be used for the control of various animal and plant pests. They are particularly suitable for the control of insects of the families: Acrididae, Blattidae, Gryllidae, Gryllotalpidae, Tettigoniidae, Cimicidae, Phyrrhocoridae, Reduviidae, Aphididae, Delphacidae, Diaspididae, Pseudococcidae, Chrysomelidae, Coccinellidae, Bruchidae, Scarabaeidae, Dermestidae, Tenebrionidae, Curculionidae, Tineidae, Noctuidae, Lymantriidae, Pyralidae, Galleridae, Culicidae, Tipulidae, Stomoxydae, Muscidae, Calliphoridae, Trypetidae and Pulicidae, as well as acarids of the families: Ixodidae, Argasidae, Tetranychidae and Dermanyssidae.

The insecticidal or acaricidal action can be appreciably broadened and adapted to suit given circumstances by the addition of other insecticides and/or acaricides. Suitable additives are, for example: organic phosphorus compounds; nitrophenols and derivatives thereof; formamidines; carbamates; ureas; pyrethrin-like compounds and chlorinated hydrocarbons.

In addition to possessing the above-mentioned properties, the compounds of formula I are effective also against members of the division Thallophyta. Some of these compounds thus have a bactericidal action. In particular, however, they are effective against fungi, especially against phytopathogenic fungi belonging to the following classes: Oomycetes, Zygomycetes, Ascomycetes, Basidiomycetes and Denteromycetes. The compounds of formula I moreover have a fungitoxic action in the case of fungi which attack the plants from the soil. Furthermore, the new active substances are suitable for the treatment of seed, fruits, tubers, etc., for protection against fungus infections. The compounds of formula I are suitable also for the control of phytopathogenic nematodes.

The compounds of formula I can be used on their own or together with suitable carriers and/or additives. Suitable carriers and additives may be solid or liquid, and correspond to the substances common in formulation practice, such as, e.g. natural and regenerated substances, solvents, dipersing agents, wetting agents, adhesives, thickeners, binders and/or fertilisers.

For application, the compounds of formula I can be processed into the form of dusts, emulsion concentrates, granulates, dispersions, sprays, or solutions, the formulation of these preparations being effected in a manner commonly known in practice. Also to be mentioned are cattle dips and spray races, in which aqueous preparations are used.

The agents according to the invention are produced in a manner known per se by the intimate mixing and/or grinding of active substances of formula I with the suitable carriers, optionally with the addition of dispersing agents or solvents which are inert to the active substances. The active substances can be obtained and used in the following preparation forms:

solid preparations: dusts, scattering agents, granulates, coated granulates, impregnated granulates and homogeneous granulates;
liquid preparations:
  a. water dispersible active-substance concentrates: wettable powders, pastes, emulsions;
  b. solutions.

The content of active substance in the described agents is between 0.1 and 95%; it is to be mentioned in this connection that in the case of application from an aeroplane, or by means of other suitable devices, it is possible to use an even higher concentration of active substance.

The active substances of formula I can be prepared, for example, as follows:

Dusts:

The following substances are used in the preparation of (*a*) a 5% dust, and (*b*) a 2% dust:
  a. 5 parts of active substance,
  95 parts of talcum;
  b. 2 parts of active substance,
  1 part of highly dispersed silicic acid,
  97 parts of talcum.

The active substances are mixed and ground with the carriers.

Granulate:

The following substances are used to produce a 5% granulate:
  5 parts of active substance,
  0.25 parts of epichlorhydrin,
  0.25 parts of cetyl polyglycol ether,
  3.50 parts of polyethylene glycol,
  91 parts of kaolin (particle size 0.3 - 0.8 mm).

The active substance is mixed with epichlorhydrin and dissolved with 6 parts of acetone; the polyethylene glycol and cetyl polyglycol ether are then added. The solution thus obtained is sprayed on to kaolin, and the acetone subsequently evaporated off in vacuo.

Wettable powder:

The following constituents are used for the preparation of (*a*) a 40%, (*b*) and (*c*) a 25%, and (*d*) a 10% wettable powder:
  a. 40 parts of active substance,
  5 parts of sodium lignin sulphonate,
  1 part of sodium dibutyl-naphthalene sulphonate,
  54 parts of silicic acid.
  b. 25 parts of active substance,
  4.5 parts of calcium lignin sulphonate
  1.9 parts of Champagne chalk/hydroxyethyl cellulose mixture (1:1),
  1.5 parts of sodium dibutyl naphthalene sulphonate,
  19.5 parts of silicic acid,
  19.5 parts of Champagne chalk,
  28.1 parts of kaolin.
  c. 25 parts of active substance,
  2.5 parts of isooctylphenoxy-polyoxyethylene-ethanol
  1.7 parts of Champagne chalk/hydroxyethyl cellulose mixture (1:1),
  8.3 parts of sodium aluminium silicate,
  16.5 parts of kieselguhr,
  46 parts of kaolin.
  d. 10 parts of active substance,
  3 parts of a mixture of the sodium salts of saturated fatty alcohol sulphates,
  5 parts of naphthalenesulphonic acid/formaldehyde condensate,
  82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates:

The following substances are used to produce (*a*) a 10% and (*b*) a 25% emulsifiable concentrate:
  a. 10 parts of active substance,
  3.4 parts of epoxidised vegetable oil,
  3.4 parts of a combination emulsifier consisting of fatty alcohol polyglycol ether and alkylarylsulphonate calcium salt,
  40 parts of dimethylformamide,
  43.2 parts of xylene.
  b. 25 parts of active substance,
  2.5 parts of epoxidised vegetable oil,
  10 parts of an alkylarylsulphonate/fatty alcohol polyglycol ether mixture
  5 parts of dimethylformamide,
  57.5 parts of xylene.

From these concentrates it is possible to produce, by dilution with water, emulsions of any desired concentration.

Spray:

The following constituents are used to prepare a 5% spray:
  5 parts of active substance,
  1 part of epichlorhydrin,
  94 parts of ligroin (boiling limits 160°-190°C).

EXAMPLE 1

Preparation of 1-(4-chloro-2-methylphenyl)-3,5-dimethyl-1,3,5-triazapenta-1,4-diene A solution of 16 g of N,N-dimethylformamidine in 39.5 g of ethyl-N-4-chloro-2-methylphenylformimidate is heated, with stirring, at a bath temperature of 120°C for 20 hours. The ethanol forming during the reaction is continuously distilled off. After high-vacuum distillation of the resulting reaction product, there is obtained the compound of the formula

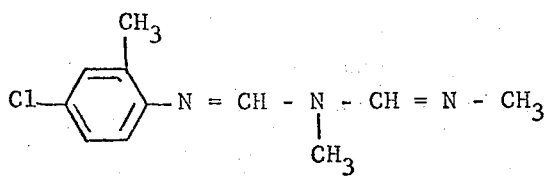
having a boiling point of 122°C/0.04 Torr.
The following further compounds are prepared in an analogous manner:
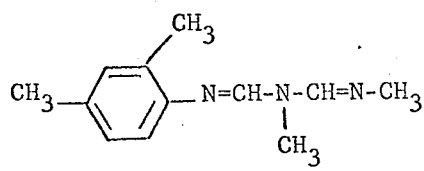
B.P.: 126-128°C/0,2 Torr
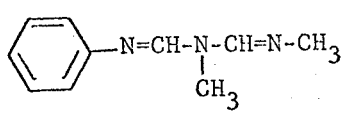
B.P.: 105°C/0,09 Torr
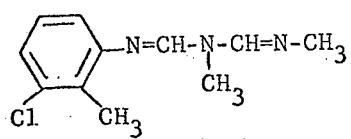
B.P.: 128°C/0,08 Torr
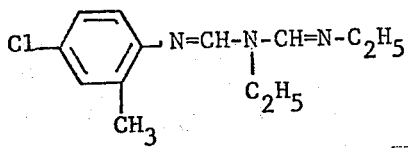
B.P.: 126°C/0,1 Torr
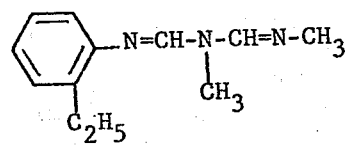
B.P.: 114-116°C/0,12 Torr
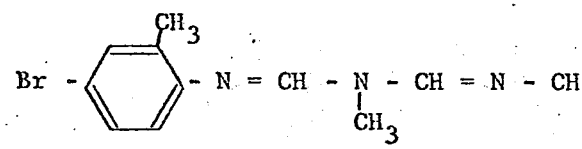
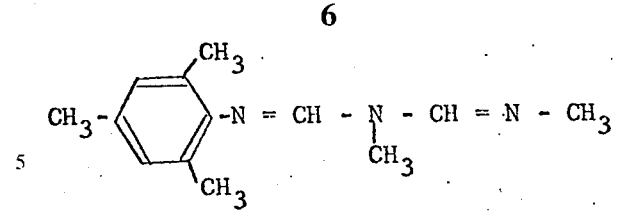
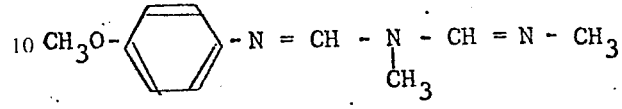
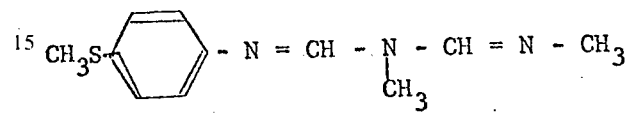
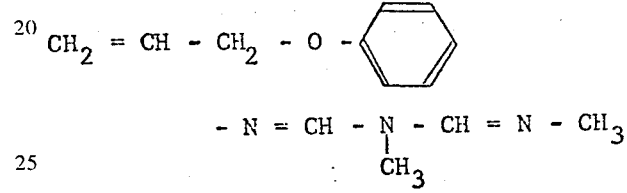
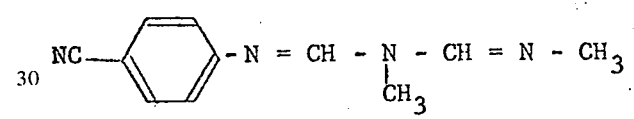
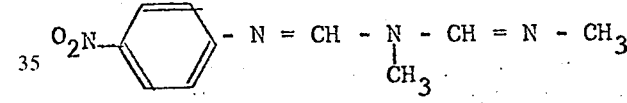
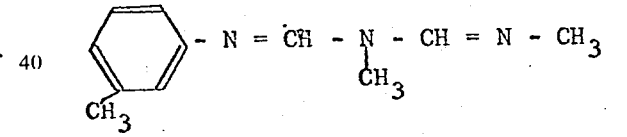
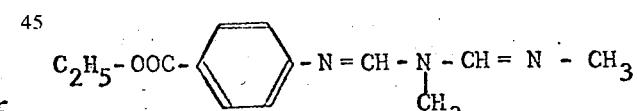
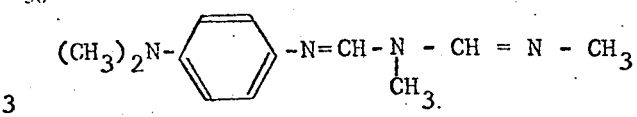
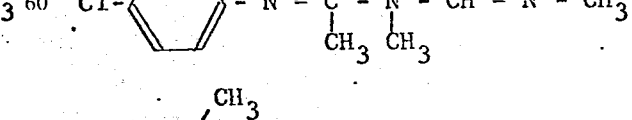
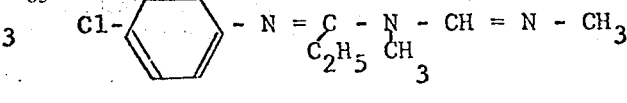

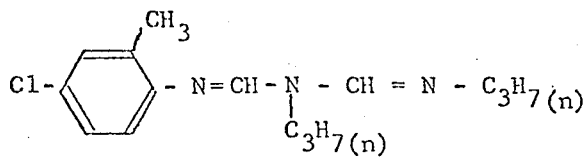

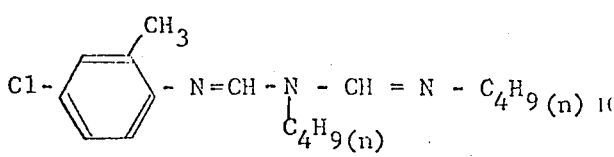

EXAMPLE 2

A. Insecticidal stomach poison action

Cotton and potato plants were sprayed with a 0.05% aqueous active-substance emulsion (obtained from a 10% emulsifiable concentrate).

After the drying of the obtained coating, *Spodoptera litoralis* or *Heliothis virescens* larvae $L_3$ were placed onto the cotton plants, and Colorada beetle larvae (*Leptinotarsa decemlineata*) onto the potato plants. The test was carried out at 24°C with 60% relative humidity.

The compounds according to Example 1 exhibited in the above test a good insecticidal stomach poison action against *Spodoptera litoralis*, Heliothis and *Leptinotarsa decemlineata larvae*.

B. Systemic insecticidal action

In order to determine the systemic action, rooted bean plants (*Vicia faba*) were placed into a 0.01% aqueous active-substance solution (obtained from a 10% emulsifiable concentrate). After a period of 24 hours, bean aphids (*Aphis fabae*) were placed onto the parts of the plants above the soil. The insects were protected by a special device from the effects of contact and of gas. The test was carried out at 24°C with 70% relative humidity.

In the above test, the compounds according to Example 1 exhibited a systemic action against *Aphis fabae*.

EXAMPLE 3

Action against *Chilo suppressalis*

Rice plants of the type Caloro were planted, 6 plants per pot, in plastic pots having a top diameter of 17 cm, and grown to a height of ca. 60 cm. Infestation with *Chilo suppressalis* larvae ($L_1$; 3–4 mm long) was carried out 2 days after application of the active substance in granular form (amount applied = 8 kg of active substance per hectare) to the paddy water. The evaluation of the insecticidal action was made 10 day after application of the granules.

The compounds according to Example 1 were effective against *Chilo suppressalis* in the above test.

EXAMPLE 4

Action against ticks

A. *Rhipicephalus bursa*

In each case, 5 adult ticks or 50 tick larvae were placed into a small glass test tube, and the test tubes were then immersed for 1 to 2 minutes in 2 ml of an aqueous emulsion from a dilution series of 100, 10, 1 and 0.1 ppm of test substance. The tubes were then sealed with a standardised cotton plug, and inverted so that the active substance emulsion could be absorbed by the cotton wool.

An evaluation in the case of the adults was made after 2 weeks, and in the case of the larvae after 2 days. There were two repeats for each test.

B. *Boophilus microplus* (larvae)

With the dilution series analogous to that in Test A, tests were carried out with 20 sensitive larvae and OP-resistant larvae, respectively (resistance is with respect to diazinon compatibility).

Compounds according to Example 1 were effective in these tests against adults and larvae of *Rhipicephalus bursa* and against sensitive and OP-resistant larvae, respectively, of *Boophilus microplus*.

EXAMPLE 5

Acaricidal action

*Phaseolus vulgaris* (plants) were infested, 12 hours before the test for acaricidal action, with an infested piece of leaf from a mass culture of *Tetranychus urticae*. The transferred mobile stages were sprayed with the emulsified test preparations from a chromatography-sprayer in a manner ensuring no running off of the spray liquor. An assessment was made after 2 to 7 days, by examination under a binocular, of the living and of the dead larvae, adults and eggs, and the results expressed in percentages. The treated plants were kept during "holding time" in greenhouse compartments at 25°C.

The compounds according to Example 1 were effective in the above test against adults, larvae and eggs of *Tetranychus urticae*.

EXAMPLE 6

Action against soil nematodes

In order to test the action against soil nematodes the active substances were added, in the concentration stated in each case, to soil infested with root-gallnematodes (*Meloidogyne arenaria*), and the whole intimately mixed. In the one test series, tomato seedlings were planted immediately afterwards in the thus prepared soil, and in the other test series tomatoes were planted after a waiting time of 8 days.

For an assessment of the nematicidal action, the galls present on the roots were counted 28 days after planting and sowing, respectively.

Active substances according to Example 1 exhibited in this test a good action against *Meloidogyne arenaria*.

What we claim is:

1. A 1,3,5-triazapenta-1,4-diene of the formula

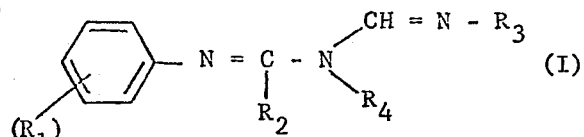

wherein
$R_1$ is selected from the group consisting of hydrogen, halogen, alkyl, alkoxy, alkylthio, alkenyloxy, cyano, nitro, dialkylamino and carbalkoxy,
wherein the alkyl, alkoxy and alkenyl chains of said radicals contain from one to 18 carbon atoms,
$n$ is an integer of from 1 to 5,
$R_2$ represents hydrogen or an alkyl radical of from one to 18 carbon atoms, and
$R_3$ and $R_4$ each represent an alkyl radical of from one to 18 carbon atoms.

2. A compound according to claim 1 wherein
$R_1$ is selected from the group consisting of hydrogen, chlorine, alkyl of from one to four carbon atoms, haloalkyl of from one to four carbon atoms, alkoxy of from one to four carbon atoms, alkylthio of from one to four carbon atoms, alkenyloxy of from three to five carbon atoms, cyano, nitro, dialkylamino wherein the alkyl chains contains from one to four carbon atoms and carbalkoxy wherein the alkoxy chain contains from one to four carbon atoms,
$n$ is an integer of from 1 to 3,
$R_2$ represents hydrogen, and
$R_3$ and $R_4$ each represent an alkyl radical of from one to six carbon atoms.

3. A compound according to claim 2 wherein
$R_1$ is selected from the group consisting of hydrogen chlorine and methyl,
$n$ is 1 or 2,
$R_2$ represents hydrogen, and
$R_3$ and $R_4$ each represent methyl.

4. The compound according to claim 3 of the formula

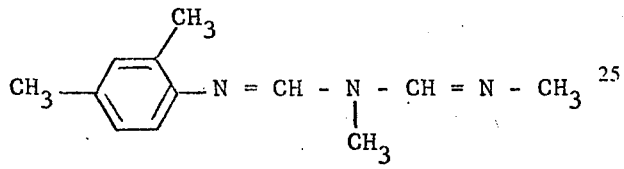

5. The compound according to claim 3 of the formula

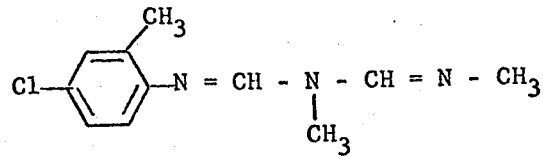

6. The compound according to claim 3 of the formula

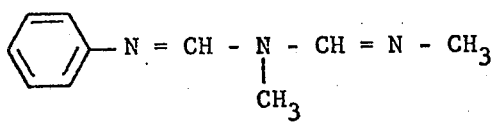

7. The compound according to claim 3 of the formula

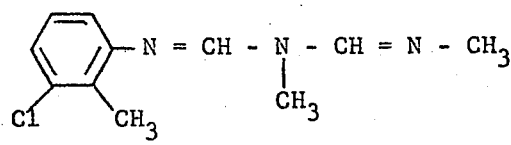

* * * * *